INVENTOR
ROBERT H. MATHES

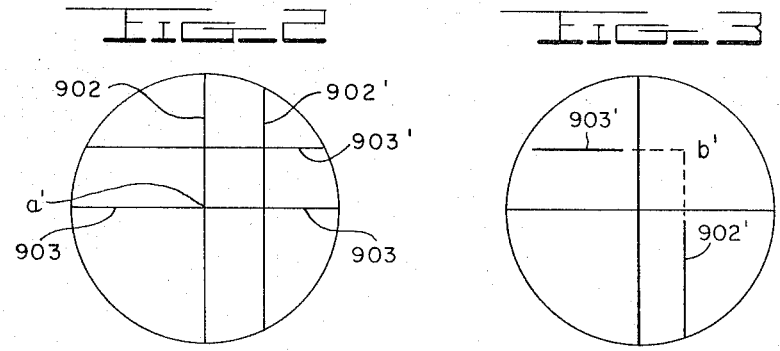
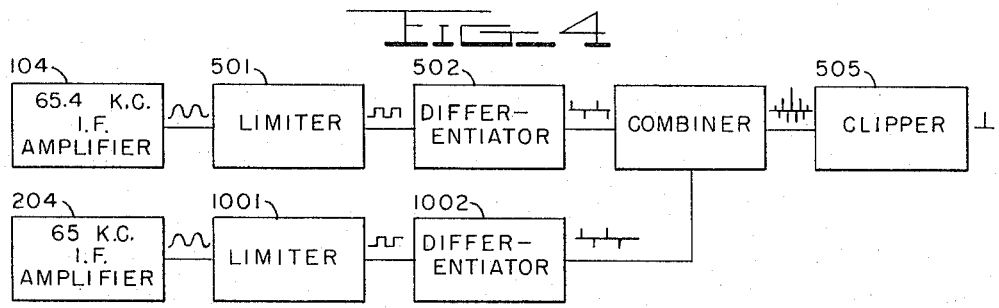
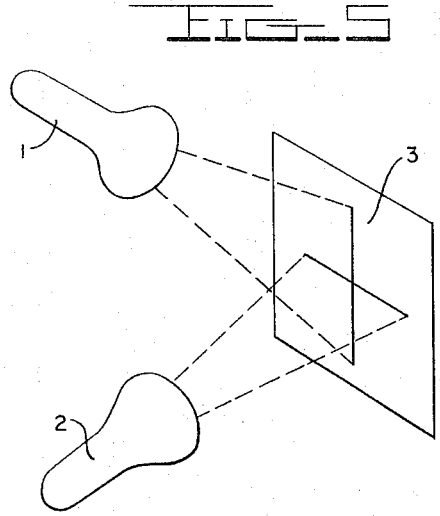

United States Patent Office 3,302,204
Patented Jan. 31, 1967

3,302,204
DIRECTION INDICATOR
Robert H. Mathes, Washington, D.C., assignor to the United States of America as represented by the Secretary of the Navy
Filed Dec. 5, 1950, Ser. No. 199,275
11 Claims. (Cl. 343—113)

The invention described herein may be manufactured and used by or for the Government for governmental purposes without the payment of any royalty thereon.

This invention relates in general to an object or direction locator system and includes a modification of U.S. application Serial No. 16,893, filed March 25, 1948 by Dr. Harold Saxton entitled "Sector Scan Indicator," now Patent No. 3,024,441.

More specifically this invention relates to direction finding apparatus in which azimuth and elevation error is indicated by means of a scope pattern simulating the cross hairs on a gun sight.

In general the present invention provides a novel object locator system which utilizes a plurality of energy detecting elements having overlapping directional zones of receptivity symmetrically disposed in opposing angular relation about an axis of symmetry.

More specifically these detecting elements include four energy detecting elements whose directivity patterns are symmetrically positioned about a common axis. Two of these elements are physically disposed in a symmetrical fashion about a vertical line, and two are disposed symmetrically about a horizontal line so that the point of intersection of the horizontal and vertical lines locates a point which is equidistant from all four of the detecting elements. The former pair of elements will be called the azimuth error detecting means and the latter pair will be called the elevation error detecting means.

Associated with each detecting element is a separate superheterodyne receiving channel. The receiving channel associated with the azimuth error detecting means (which will be called the azimuth receiving channels) are each equipped with independent local oscillators which are adjusted to operate at a different frequency. These receiving channels are thus provided with different intermediate frequencies. The receiving channel associated with the elevation error detecting means (which will be called the elevation receiving channels) are respectively identical with the two receiving channels associated with the azimuth error detecting means.

The local oscillator signals of the two azimuth receiving channels are heterodyned together as well as those of the elevation channels to produce a first pair of difference frequencies which are used to respectively synchronize the frequency of two sweep generators.

In a similar manner, the intermediate frequency signal outputs of the two azimuth receiving channels are heterodyned together as well as those of the two elevation channels to produce a second pair of difference frequency components which are equal to the first difference frequency but which vary in phase with respect to the corresponding first frequency in degree proportional to the phase difference of the wave received by the detecting elements of the azimuth and elevation energy detecting means.

These latter voltages are properly shaped into narrow sharp pulses and fed to appropriate beam control elements of a cathode ray tube.

The cathode ray tube has a single face, but has two complete and separate electron gun and control paths. That is, there are two pairs of horizontal and vertical deflection means, two control grids, and two cathodes utilizing a common screen.

The pulses originating from the azimuth receiving channels are fed both to the vertical deflecting means and the intensity control circuit of the part of the electron tube which will be called the azimuth error indication portion whereby the associated electron beam is both intensity modulated and deflected by the output of the azimuth receiver channel. Likewise, the pulses originating from the elevation receiving channel are fed to both the horizontal deflection means and the intensity control circuit of the other portion of the cathode ray tube which will be called the elevation error indicating portion.

The sweep voltage synchronized from the beat frequency of the azimuth receiving channel local oscillators is fed to the horizontal deflection means of the azimuth error indicating portion of the cathode ray tube, and the other sweep voltage which is synchronized from the beat frequency of the elevation receiving channel local oscillators is fed to the vertical deflecting plates of the elevation error indicating portion of the cathode ray tube.

The electron beams of both cathode ray tube portions are normally cut off and are rendered visible only during the presence of the output pulses produced from the receiver.

The result of the present invention is an indication on the scope face of two crossed trace lines which simulate the cross hairs on a gun sight. The detecting means can then bodily be moved as a unit so as to place the point of intersection of the two traces on a target reference point which is generally in the center of the scope.

This invention results in a very convenient, relatively simple, accurate, and dependable indication system.

It is dependable in that if any of the four receiving channels becomes inoperative, it is immediately known since one of the traces then disappears.

In the more conventional elevation-azimuth indicators such as shown in the U.S. patent to Jansky, 2,437,695, where the error is shown by the position of a single spot on the face of a cathode ray tube, the indication that a circuit failure is present giving a false spot location is not so readily apparent.

Accordingly, an object of this invention is to provide a new and improved azimuth-elevation error indicating system.

Another object of the present invention is to provide a novel object locator system in which the azimuth and elevation error is indicated by the position of two crossed trace lines on the face of a cathode ray tube thus simulating the cross hairs of a gun sight.

Further objects and features of the present invention will become apparent upon careful consideration of the following detailed description when read in conjunction with the accompanying drawings in which:

FIGURES 2 and 3 show various oscilloscope patterns obtained under different signal conditions.

FIGURE 4 shows a modification of the embodiment of FIGURE 1.

FIGURE 5 is an alternative embodiment of the present invention.

Figure 1:
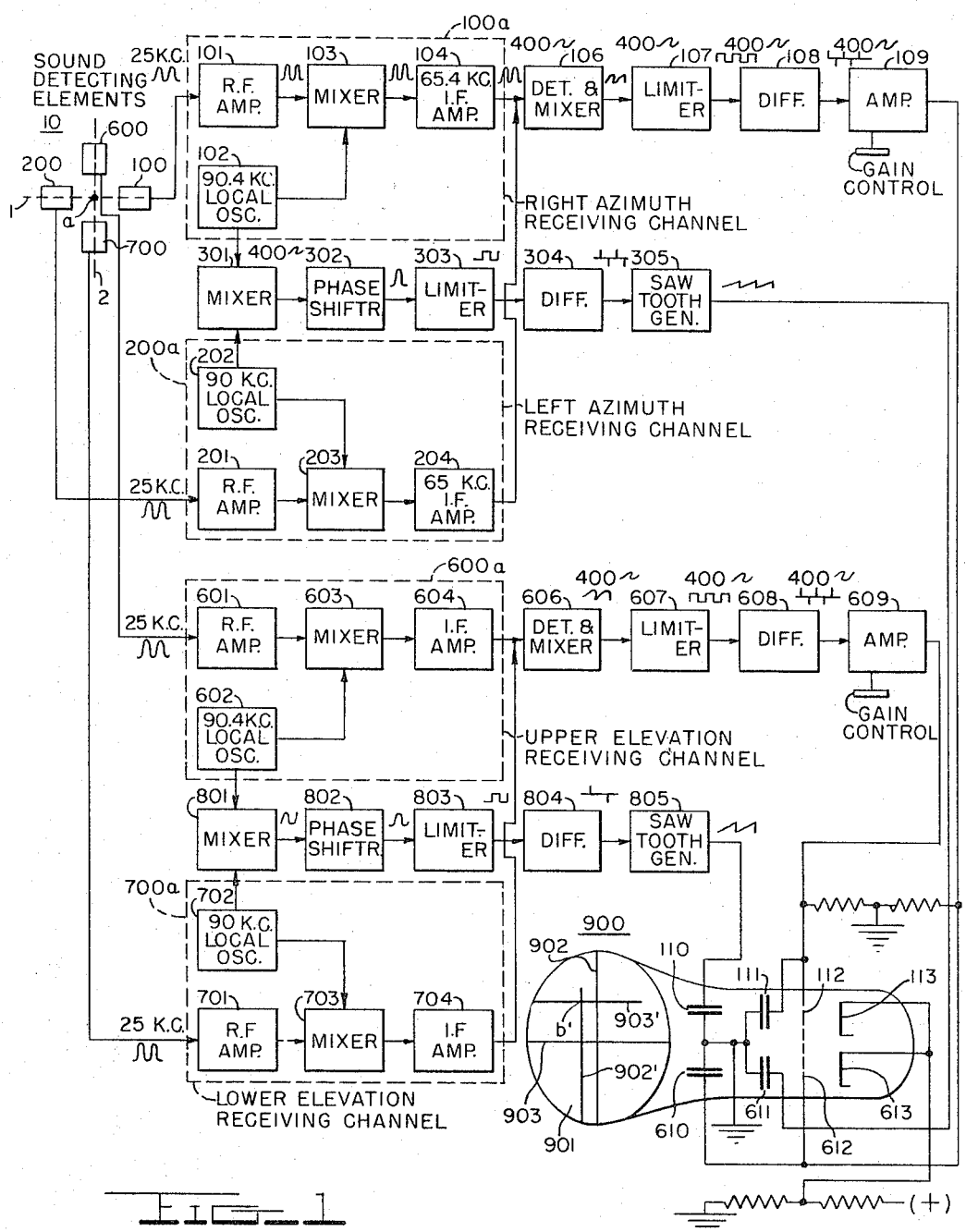
FIGURE 1 is a block diagram of one typical embodiment of this invention.

For purposes of clarity the present invention will be described in connection with a sound detecting system, it being understood that the principles herein disclosed readily lend themselves to other applications. For example, the present invention could be used to detect the direction of a source of an electromagnetic wave rather than a sound wave.

Referring now in particular to FIGURE 1, there is disclosed the teachings of the present invention as applied to a sound detecting device. This particular embodiment comprises a sound energy detecting means 10, comprising respectively a right, left, upper, and lower sound detecting elements, 100, 200, 600, and 700 or electronically derived equivalents. These elements may be of the well known sound detecting elements (such as exemplified by the crystal microphone etc.) which deliver an electrical voltage in response to a physical displacement. The response pattern of these elements should be unidirectioinal to the extent that there is no 180 degree ambiguity. The directivity pattern of these elements must be overlapping and extend generally in a direction along the line of symmetry of these elements. The said detecting elements are symmetrically arranged about a point $a$ and are preferably movable together as a unit both in azimuth and in elevation.

Of course, if desired, the said detecting elements could be used to transmit a sound wave as well as to receive this kind of energy. For cases where the object to be located generates insufficient sound waves of its own, this must be done in which case the echo sound wave will be the signal detected by detecting means 10.

Detecting elements 100-200 are located equi-distant from point $a$ and along a horizontal line $h$—$h$. These elements will be referred to as the azimuth error detecting means.

Likewise detectiing elements 600-700 are located equidistant from point $a$ but along a vertical line $v$—$v$. These latter elements will be referred to as elevation error detecting means.

It should be apparent that a sound wave originating along the axis of symmetry of the detector elements will strike all of said elements simultaneously and the electrical impulses delivered by these elements will be in phase. If however the line of symmetry is exactly vertically below or above the sound source, then the sound wave will strike respectively the lower element 700 or the upper element 600 first so that the phase of the electrical voltage delivered by element 700 for example will respectively either lead or lag the voltage delivered by element 600. In this last example, the voltages delivered by the azimuth error detecting elements will of course be in phase.

From what has already been said, it is apparent that if the line of symmetry is horizontally disposed to one side of the sound source then the voltage delivered by elements 200 will lead or lag the other azimuth error detecting element depending on whether the line of symmetry is either respectively to the left or to the right of this line.

To each of the aforementioned sound detecting elements is coupled a conventional superheterodyne receiver 100a, 200a, 600a, 700a, comprising R.F. amplifiers 101, 201, 601, and 701; mixers 103, 203, 603 and 703; local oscillators 102, 202, 602, and 702; and I.F. amplifiers 104, 204, 604, and 704. One of the local oscillators 102, 602, from each of the azimuth and elevation receiving channels operates at a different frequency from the other associated local oscillators 202, 702 so that two different I.F. frequencies result.

The output from the I.F. amplifiers of the respective azimuth and elevation receiving channels are respectively fed to conventional detector and mixer circuits 106 and 606, where they beat together to give a difference frequency having the envelope shape as shown in FIGURE 1. Then these pulses at the beat frequency (400 cycles in the example shown in FIGURE 1) are put through a conventional limiter circuit 107, 607 which squares up the beat wave. Then these pulses are differentiated by a conventional differentiator circuit 108, 608 to produce a series of sharp positive and negative pulses. These are amplified by amplifier 109 and 609. The pulses originating from the azimuth receiving channels are fed from amplifier 109 to the vertical deflection means 610 and to the intensity control grid 612 associated with the lower electron gun apparatus of cathode ray tube 900.

The phase of these pulses varies as sense and magnitude of the phase difference of the voltages delivered by the azimuth and elevation error detecting elements (100, 200, 600, 700) change.

In a like manner, the pulses originating from the elevation receiving channel are fed from amplifier 609 to the horizontal deflection means 111 and to intensity control grid 112 of the upper electron gun portion of cathode ray tube 900.

The cathodes 613 and 113 are coupled to a source of positive bias voltage which normally prevents the two electron streams from reaching the cathode ray tube face 901. When the positive differentiated pulses are applied to control grids 112 and 612 and deflection plates 111 and 611 from amplifiers 109 and 609, the electron streams are unblocked simultaneously and deflected to produce two crossed traces (as hereinafter described) on the face 901 of the cathode ray tube 900. The position of the crossed traces is controlled by the horizontal and vertical sweeps applied to the azimuth and elevation portions of tube 900 as hereinafter explained.

The horizontal and vertical sweeps are respectively obtained from conventional sawtooth wave generators 305 and 805. The synchronizing voltage for these sawtooth wave generators are obtained respectively from the heterodyning of the azimuth and elevation receiving channel local oscillators 102-202, and 602-702. These local oscillator voltages, which differentiate in frequency in this case by 400 cycles, are fed respectively to suitable mixers (like 103 and 203 etc.) of the conventional variety (for example the conventional pentigrid mixer found in most superheterodyne receivers). In the output of the mixers 301 and 801, the difference frequency of 400 cycles is filtered out and fed to a conventional phase shift circuit 302 and 802 (the purpose of which will soon be apparent). A conventional limiter or clipper circuit 303 and 803 squares up the sinusoidal 400 cycle difference frequency, and then the resulting square wave is differentiated to form a series of sharp reference synchronizing pulses which synchronize the repetition rate of sawtooth generators 305 and 805 respectively to 400 cycles per second.

In the absence of receiver signal voltages applied to the deflection means, the position of the horizontal and vertical sweep trace, if the electron streams are unblocked, is made to fall near the periphery of the cathode ray tube face so that the major portion of the cathode ray tube face will be useful for the purpose of indicating azimuth and elevation error. The variable phase pulses fed to the horizontal and vertical deflection plates 111 and 610 appear on the face of cathode ray tube 900 respectively as lines 903' and 902'. Since the phase of the pulses is dependent on the elevation and azimuth of the target, then the position of the lines or pulses 903' and 902' varies with target bearing as does the point of intersection of the pulses at $b'$.

The operation of the apparatus shown in FIGURE 1 is as follows: When the apparatus is turned on, sound waves are obtained from a dummy target located on the axis of symmetry of sound detecting means 10. Then phase shifters 302 and 802 are varied so that the trace lines cross at a point in the center of the cathode ray tube face 901 in coincidence with cross hairs 902-903 painted or otherwise placed on the face of the tube.

The dummy target in the case where the apparatus transmits its own pulse can be any suitable object rigidly connncted to the energy detecting means 10 so that it is always located on the axis of symmetry thereof.

In the case where only the sound waves from the targets can be used, the dummy load is still rigidly attached to the energy detecting means but would then be made to propogate its own sound wave.

Assume that a sound source is located just above and to the right of the axis of symmetry of the detecting means 10. Referring to FIGURE 2, cross traces 902' 903' will appear and will cross above and to the right of the center point *a'* where the reference cross lines 902 and 903 intersect if the connections of the sweep generator are made to the proper deflection plate terminal. Of course, this connection is determined by the polarity sequence of the sweep voltage waveform.

The distance of trace 903' from reference line 903 gives an indication of the elevation error, and the distance of trace 902' from reference line 902 gives an indication of the azimuth error. The sense of the error, as previously intimated, is given by the relative up or down, or left or right position of the respective traces 903' and 902' from the reference trace caused by the dummy source.

FIGURE 3 shows the trace pattern caused by a weak sound wave signal. The traces do not cross here because the signal pulses from amplifiers 109 and 609 are of insufficient level to cause the traces to cross. Of course the azimuth and elevation error are still accurately given since this error is determined by the position of the trace lines and not their amplitude.

If the gain of the receiver is increased, then the lines 902'–903' in FIGURE 3 can be caused to intersect as shown in FIGURE 2. Then the reference lines 902–903 become analogous to the cross hairs on a gun sight and the point *b'* where lines 902'–903' cross represents the target. The person who controls the position of detecting means 10, can immediately bring points *a'* and *b'* in coincidence by moving detection 10 upward and to the right.

To prevent too many signal indications from confusing the operator, detecting elements 100, 200, 600, 700, can be selected to have relatively sharp response patterns.

Also, for the situation when the apparatus is used to generate its own sound wave pulses, a range gate circuit which renders the cathode ray tube trace inoperative except for a given range band, can be utilized to prevent confusion. These range gate circuits are common and well known in the art and do not come within the scope of the prevent invention.

Although I have shown and described only a certain and specific embodiment of the present invention, it should be understood that there are many possible modifications which can be made without departing from the true spirit of the present invention.

For example, there are alternative ways of obtaining pulses whose position varies in sense and degree with the sense and degree of phase difference of the voltage delivered by the azimuth and elevation detecting elements 100–200, 600–700. FIGURE 4 shows such an embodiment as applied only to the azimuth receiving channel.

In the embodiment of FIGURE 4, instead of first beat-the sinusoidal I.F. frequencies together, first the I.F. sinusoidal frequencies are converted to square waves by limiters 501 and 1001, and differentiated then by differentiating circuits 502 and 1002, whereupon the resulting pulses are combined producing pulses whose envelope varies at the beat frequency rate. Then clipper or amplitude discriminator 505 allows only the positive peaks of the input pulses to appear in its output circuit. These pulses occur at the 400 cycle difference frequency and are fed to the intensity grid and deflecting means 112 and on as before.

If desired a single local oscillator could be substituted for oscillators 202 and 702.

Also two separate cathode ray tubes 1–2 each having one electron gun assembly could be substituted for cathode ray tube 900 by projecting the screen pattern on a third surface 3 as shown in FIGURE 5.

What is claimed is:

1. An object locator system for detecting the azimuth and elevation of energy emanating or reflected from a remote object comprising a first pair of energy detecting means having overlapping zones of receptivity physically disposed along a first given line, a second pair of energy detecting means having overlapping zones of receptivity with each other and with said first pair of energy detecting means disposed along a second given line which is at right angles with respect to said first given line, a separate superheterodyne receiving channel including a local oscillator therefor coupled to each of said energy detecting means, the local oscillators of the receiver channels associated with each pair of energy detecting means operative at different frequencies whereby said receiver channels have distinct intermediate frequencies, first and second means respectively coupled to the local oscillators for producing the beat frequency of the local oscillators associated with each pair of detecting means, third and fourth means coupled with the respective receiver channels associated with said first and second pair of detecting means for combining the intermediate frequency signals of said respective receiver channels to produce pulses occurring at the beat frequency of said respective intermediate frequencies, a cathode ray tube having a single screen but including distinct first and second electron gun portions each having at least a vertical and horizontal deflecting means, a first and second sweep generator means, means coupled between said first means and said first sweep generator means for synchronizing said first sweep generator means with the frequency of the voltage output of said first means, means coupled between said second means and said second sweep generator for synchronizing said second sweep generator means with the frequency of the voltage at the output of said second means, means coupling the respective output of said first and second sweep generator means respectively to the horizontal deflection means of the first electron gun portion and the vertical deflection means of said second electron gun portion, means coupling said third means to the vertical deflection means of the first electron gun portion of said cathode ray tube, means coupling said fourth means to the horizontal deflection means of the second electron gun portion of said cathode ray tube.

2. An object locator system for detecting the azimuth and elevation of energy emanating or reflected from a remote object comprising a first pair of energy detecting means having overlapping zones of receptivity physically disposed along a first given line, a second pair of energy detecting means having overlapping zones of receptivity with each other and with said first pair of energy detecting means disposed along a second given line which is at right angles with respect to said first given line, a separate superheterodyne receiving channel including a local oscillator therefor coupled to each of said energy detecting means, the local oscillators of the receiver channels associated with each pair of energy detecting means operative at different frequencies whereby said receiver channels operate with distinct intermediate frequencies, first and second means respectively coupled to the local oscillators for producing the beat frequency of the local oscillators associated with each pair of detecting means, third and fourth means coupled with the respective receiver channels associated with said first and second pair of detecting elements for combining the intermediate frequency signals of said respective receiver channels to produce pulses occurring at the beat frequency of said respective intermediate frequencies, a cathode ray tube having a single screen but including distinct first and second electron gun portions each having at least a vertical and horizontal deflecting means and an intensity control electrode, a first and second sawtooth sweep generator means, means coupled between said first means and said first sweep generator means for synchronizing same at the frequency of the voltage at the output of said first means, means coupled between said second means and said second sweep generator for synchronizing same at the frequency of the voltage at the output of said second means, means coupling the respective output of said first and second sweep generator means respectively to the horizontal deflection means of the first electron gun portion and the vertical deflection means of said second electron gun portion, respective beam intensity control means for normally rendering the sweep trace invisible to the eye, means coupling said third means to the vertical deflection means of and to said intensity control means associated with the first electron gun portion of said cathode ray tube whereby the pulses associated therewith appear on the screen of said cathode ray tube, means coupling said fourth means to the horizontal deflection means of and to the intensity control means associated with the second electron gun portion of said cathode ray tube whereby the pulses associated therewith appear on the screen of said cathode ray tube.

3. In a signal direction locator system having a pair of reference pulses and a pair of error signals each having phase relative to one of said respective reference pulses in accordance with the azimuth and elevation error, the combination comprising a cathode ray tube having a first and second electron gun portion each including at least a separate horizontal and vertical deflection means and having only a single screen common to both electron gun portions, a first and second sweep generator means respectively synchronized by one of said pair of reference pulses, means coupling the output from said first and second sweep generator means respectively to the horizontal deflecting means of said first electron gun portion and to the vertical deflection plates of said second electron gun portion, means coupling said pair of error signals respectively to the vertical deflection means of said first electron gun portion and the horizontal deflection means of said second electron gun portion.

4. In a signal direction locator system having a pair of reference pulses and a pair of error signals each having phase relative to one of said respective reference pulses in accordance with the azimuth and elevation error, the combination comprising a cathode ray tube having a first and second electron gun portion each including at least a separate horizontal and vertical deflection means, and having only a single screen common to both electron gun portions, a first and second sawtooth sweep generator means respectively synchronized by one of said pair of reference pulses, means coupling the output from said first and second sweep generator means respectively to the horizontal deflecting means of said first electron gun portion and to the vertical deflection plates of said second electron gun portion, means coupling said pair of error signals respectively to the vertical deflection means of said first electron gun portion and the horizontal deflection means of said second electron gun portion.

5. In a signal direction locator system having a pair of reference pulses and a pair of error signals each having phase relative to one of said respective reference pulses in accordance with the azimuth and elevation error, the combination comprising a cathode ray tube having a first and second electron gun portion each including at least a separate horizontal and vertical deflection means, and having only a single screen common to both electron gun portions, a first and second sweep generator means respectively synchronized by one of said pair of reference pulses, means coupling the output from said first and second sweep generator means respectively to the horizontal deflecting means of said first electron gun portion and to the vertical deflection plates of said second electron gun portion, respective beam intensity control means for normally rendering the sweep trace substantially invisible to the eye, means coupling said pair of error signals respectively to the vertical deflection means of and the intensity control means associated with said first electron gun portion and the horizontal deflection means of and the intensity control circuit associated with said electron gun portion whereby said pulses appear on the screen of said cathode ray tube.

6. An object locator system for detecting the azimuth and elevation of energy emanating or reflected from said object comprising a first pair of energy detecting means having overlapping zones of receptivity physically disposed along a first given line, a second pair of energy detecting means having overlapping zones of receptivity with each other and with said first pair of energy detecting means disposed along a second given line which is at right angles with respect to said first given line, a separate superheterodyne receiving channel including a local oscillator therefor coupled to each of said energy detecting means, the local oscillators of the receiver channels associated with each pair of energy detecting means operative at different frequencies whereby said receiving channels operate with distinct intermediate frequencies, first and second means respectively coupled to the local oscillators for producing the beat frequency of the local oscillators associated with each pair of energy detecting means, third and fourth means coupled with the respective receiver channels associated with said first and second pair of detecting elements for combining the intermediate frequency signals of said respective receiver channels to produce pulses occurring at the beat frequency of said respective intermediate frequencies, a cathode ray tube having a single screen but including distinct first and second electron gun portions each having at least a vertical and horizontal deflecting means, a first and second saw-tooth sweep generator means, means coupled between said first means and said first sweep generator means for synchronizing same at the frequency of the voltage at the output of said first means, means coupled between said second means and said second sweep generator for synchronizing same at the frequency of the voltage at the output of said second means, means coupling the respective output of said first and second sweep generators means respectively to the horizontal deflection means of the first electron gun portion and the vertical deflection means of said second electron gun portion, means coupling said third means to the vertical deflection means of said first electron gun portion of said cathode ray tube whereby the pulses associated therewith appear on the screen of said cathode ray tube, means coupling said fourth means to the horizontal deflection means of said second electron gun portion of said cathode ray tube whereby the pulses associated therewith appear on the screen of said cathode ray tube and means for increasing the amplitude of the output of said third and fourth means whereby the signal pulses appearing on said screen interest each other.

7. An object locator system for detecting the azimuth and elevation of energy emanating or reflected from said object comprising a first pair of energy detecting means having overlapping zones of receptivity physically disposed along a first given line, a second pair of energy detecting means having overlapping zones of receptivity with each other and with said first pair of energy detecting means disposed along a second given line which is at right angles with respect to said first given ilne, said first and second lines crossing at the axis of symmetry of said first and second pair of detecting means, a separate superheterodyne receiving channel including a local oscillator therefor coupled to each of said energy detecting means, the local oscillators of the receiver channels associated with each pair of energy detecting means operative at different frequencies whereby said receiver channels have distinct intermediate frequencies, first and second means respectively coupled to the local oscillators for producing the beat frequency of the local oscillators associated with each pair of energy detecting means, third and fourth means coupled with the respective receiver channels associated with said first and second pair of detecting elements for combining the intermediate frequency signals of said respective receiver channels to produce pulses occurring at the beat frequency of said respective intermediate frequencies, a cathode ray tube having a single screen but including distinct first and second electron gun portions each having at least a vertical and horizontal deflecting means, a first and second sweep generator means, means coupled between said first means and said first sweep generator means for synchronizing same at the frequency of the voltage at the output of said first means, means coupled between said second means and said second sweep generator for synchronizing same at the frequency of the voltage at the output of said second means, means coupling the respective output of said first and second sweep generators means respectively to the horizontal deflection means of the first electron gun portion and the vertical deflection means of said second electron gun portion, means coupling said third means to the vertical deflection means of the first electron gun portion of said cathode ray tube, means coupling said fourth means to the horizontal deflection means of the second electron gun portion of said cathode ray tube.

8. An object locator system for detecting the azimuth and elevation of energy emanating or reflected from said object comprising a first pair of energy detecting means movable as a unit having overlapping zones of receptivity physically disposed along a first given line, a second pair of energy detecting means movable as a unit with said other detecting means having overlapping zones of receptivity with each other and with said first pair of energy detecting means disposed along a second given line which is at right angles with respect to said first given line, said first and second lines crossing at the axis of symmetry of said first and second pair of detecting means, a separate superheterodyne receiving channel coupled to each of said energy detecting means, the local oscillators of the receiver channels associated with each pair of energy detecting means operative at different frequencies whereby said receiving channels have distinct intermediate frequencies, first and second means respectively coupled to the local oscillators for producing the beat frequency of the local oscillators associated with each pair of energy detecting means, third and fourth means coupled with the respective receiver channels associated with said first and second pair of detecting elements for combining the intermediate frequency signals of said respective receiver channels to produce pulses occurring at the beat frequency of said respective intermediate frequencies, a cathode ray tube having a single screen but including distinct first and second electron gun portions each having at least a vertical and horizontal deflecting means, a first and second sweep generator means, means coupled between said first means and said first sweep generator means for synchronizing same at the frequency of the voltage at the output of said first means, means coupled between said second means and said second sweep generator for synchronizing same at the frequency of the voltage at the output of said second means, means coupling the respective output of said first and second sweep generators means respectively to the horizontal deflection means of the first electron gun portion and the vertical deflection means of said second electron gun portion, means coupling said third means to the vertical deflection means of the first electron gun portion of said cathode ray tube, means coupling said fourth means to the horizontal deflection means of the second electron gun portion of said cathode ray tube.

9. In a signal direction locator system having a pair of reference pulses and a pair of error signals each having phase relative to one of said respective reference pulses in accordance with the azimuth and elevation error, the combination comprising a cathode ray tube having a first and second electron gun portion each including at least a separate horizontal and vertical deflection means and having only a single screen common to both electron gun portions, a first and second sweep generator means respectively synchronized by one of said pair of reference pulses, means coupling the output from said first and second sweep generator means respectively to the horizontal deflecting means of said first electron gun portion and to the vertical deflection plates of said second electron gun portion, means coupling said pair of error signals respectively to the vertical deflection means of said first electron gun portion and the horizontal deflection means of said second electron gun portion and means for increasing the amplitude of said error signals whereby the signal pulses on said screen intersect each other.

10. An object locator system for detecting the azimuth and elevation of energy emanating or reflected from a remote object comprising a first pair of energy detecting means having overlapping zones of receptivity physically disposed along a first given line, a second pair of energy detecting means having overlapping zones of receptivity physically disposed along a second given line which is at right angles with respect to said first given line, first and second energy receiving means coupled to said first and second pair of energy detecting means respectively, a cathode ray tube display means having beam deflection means associated therewith, first and second sweep generator means coupled to the deflection means of the cathode ray tube display means for periodically deflecting the electron beam thereof in horizontal and vertical directions to produce a crosshair indication, and means coupling the outputs of said first and second receiving means to said deflection means operative to shift the position of the crosshair indication in a manner representative of the azimuth and elevation of the remote object.

11. An object locator system for detecting the azimuth and elevation of energy emanating or reflected from a remote object comprising a first pair of energy detecting means having overlapping zones of receptivity physically disposed along a first given line, a second pair of energy detecting means having overlapping zones of receptivity physically disposed along a second given line which is at right angles with respect to said first given line, first and second energy receiving means coupled to said first and second pair of energy detecting means respectively, a cathode ray tube display means having beam deflection means associated therewith, first and second sweep generator means coupled to the deflection means for deflecting the electron beam thereof in horizontal and vertical directions to produce a crosshair indication, means for synchronizing each of said sweep generators in accordance with a reference phase of the energy received, and means coupling the outputs of said first and second receiving means to said deflection means operative to shift the position of the crosshair indication in a manner representative of the azimuth and elevation of the remote object.

No references cited.

RODNEY D. BENNETT, *Acting Primary Examiner.*

SIMON YAFFEE, CHESTER L. JUSTUS, *Examiners.*

R. E. BERGER, *Assistant Examiner.*